April 27, 1954

M. C. RICHARD 2,676,430

BAIT RETRIEVER

Filed June 16, 1950

Mike C. Richard
INVENTOR.

BY *Clarence A. O'Brien*
*and Harvey B. Jacobson*
Attorneys

Patented Apr. 27, 1954

2,676,430

UNITED STATES PATENT OFFICE 2,676,430

BAIT RETRIEVER

Mike C. Richard, Lexington, Ky.

Application June 16, 1950, Serial No. 168,416

1 Claim. (Cl. 43—17.2)

This invention relates to improvements in fishermen's equipment.

An object of this invention is to provide an improved device which is operable to remove fish lures, fish hooks or the like from snares or snags below the water level, said device including a collar which has flexible members depending therefrom, at least some of which being provided with weights whereby the fish line may be used as a guide for the collar in order to lower it adjacent and against the snared fish hook to thereby shake it loose so that it may be raised.

Ancillary objects and features of importance will become apparent in following the description of the illustrated form of the invention.

Figure 1:
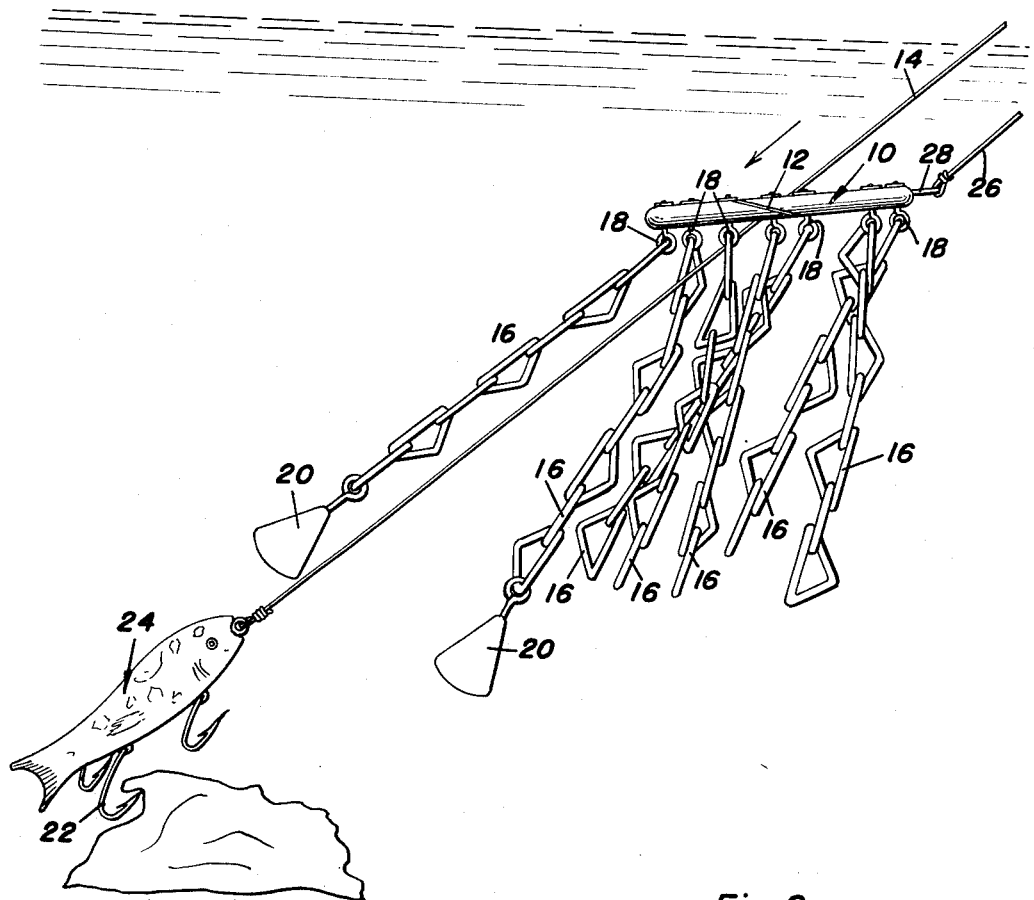
Figure 1 is an elevational view showing the device in use.
Figure 2:
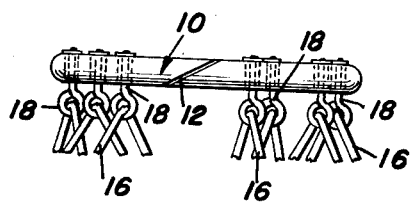
Figure 2 is a side view of the device in Figure 1, portions of the flexible members being broken away.
Figure 3:
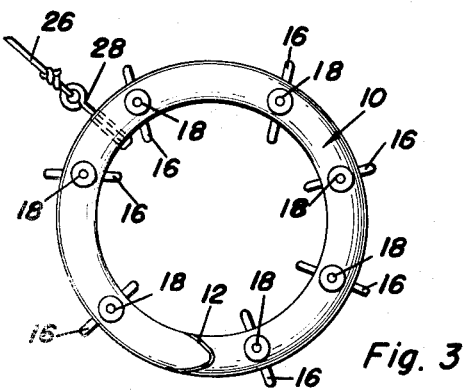
Figure 3 is a plan view of the device in Figure 2.

In carrying out the invention there is provided a collar 10 which may be of any shape, but is preferably in the shape of a ring. There is a slot 12 formed in the ring or collar splitting it so that a fish line, for example the line 14 may be slid into the center of the collar.

A plurality of flexible members, preferably chains 16 formed of a plurality of triangular links, are attached by means of the eyebolts 18 to the collar. The flexible members may be metallic or other heavy material so that they are not buoyant and at least some are provided with sinkers or weights 20 at the outer ends thereof to serve as agitators.

The chains together with the weights form an agitator which is operable to shake the fish hook 22 or the entire fish lure 24 loose from the snare as disclosed in Figure 1.

In operation when a fish lure becomes snagged, as disclosed in Figure 1, the fish line 14 is passed through the slot 12 whereby the fish line may be used as a guide to lower the device to the vicinity of the snagged fish lure. The string or cord 26 which is attached by means of the eyebolt 28 to the collar 10, is employed for lowering the device. When the chain and the weights strike the fish lure if the initial striking does not free it, agitation of the collar through the cord 26 will cause the lure to become freed. Even while the collar 10 is being lowered on the line 14, the change of angularity of the line pulling on the lure 24 may free the lure 24. However, if this is not the result, the agitation of the links which are connected freely to each other and the weight 20 causes shaking and freeing of the lure.

If the above mode of operation is unavailing, the fisherman simply jerks the line 26 causing the chains 16 and specifically, the links thereof, to become hooked on the lower hook 22. Thereafter the fisherman pulls up the line 26 which pulls the hook 22 loose from the snag or straightens the hook 22 and allows the lure 24 to be retrieved.

In many instances the lure is knocked loose from its snag by the device simply by striking it as the device slides down the fishing line. However, in some instances, it is necessary that the device be lowered completely so that the hook 22 becomes entangled with the links of the chains so that the lure may be forcefully pulled from the snag, even to the extent of destroying one of the fish hooks thereof.

Having described the invention, what is claimed as new is:

A device for freeing a snagged or snared fish lure, said device comprising a ring of circular cross-section defining a collar and having a slot therein extending at an acute angle with respect to a plane containing the ring so that the fish line may enter the collar whereby the fish line forms a guide for lowering said collar, a cord attached to said collar at one point thereof to lower said collar, and a plurality of flexible members connected at one end to the ring at peripherally spaced points therealong and consisting of chains formed of loosely connected links, certain of said flexible members being disposed on opposite sides of a diameter of the ring having the said cord attaching point and the center of the ring therein and having weights attached to their free ends.

References Cited in the file of this patent

UNITED STATES PATENTS

| Number | Name | Date |
|---|---|---|
| 955,129 | Brown | Apr. 19, 1910 |
| 1,074,632 | Lashar | Oct. 7, 1913 |
| 2,482,037 | Swaim | Sept. 13, 1949 |
| 2,516,036 | Whitlow | July 18, 1950 |

OTHER REFERENCES

Popular Science Magazine, vol. 155, Issue No. 2, page 204, Aug. 1949. (Copy in Div. 2.)